United States Patent Office 3,347,816
Patented Oct. 17, 1967

3,347,816
PIGMENTED POLYSILOXANE SURFACE COATING COMPOSITIONS FOR GLOSSY COATINGS OF INCREASED THERMAL STABILITY
Walter Krauss, Cologne-Stammheim, and Reinhard Hebermehl, Leverkusen, Germany, assignors to Farbenfabriken Bayer Aktiengesellschaft, Leverkusen, Germany, a German corporation
No Drawing. Filed Aug. 19, 1963, Ser. No. 303,131
Claims priority, application Germany, Apr. 3, 1963, F 39,394/63
5 Claims. (Cl. 260—37)

The invention relates to surface coating compositions based on organo polysiloxanes for the production of glossy pigmented coatings with high thermal stability.

It is known to use soltuions of organo polysiloxanes of the general formula $R_nSiO_{4-n/2}$, wherein $n$ is a number between 1 and 2, R represents alkyl or aryl and smaller proportions of hydroxyl or alkoxyl, for the production of surface coating compositions, which may be heated without damage, to higher temperatures than coatings of organic compounds free from silicon. It is customary to give as a measure of the thermal stability of such coatings, the temperature up to which the product maintains specific properties for a predetermined period, for example 150, 500 or 1,000 hours. In the case of pigmented coatings these properties are primarily the shade of color, the gloss and the coherence of the films. On this basis the known pigmented siloxane resin films are to be regarded as stable up to temperatures in the range of 250° C. To raise the limit of stability, polysiloxanes have already been mixed with certain pigments, namely zinc dust, aluminum flakes or special iron oxides, and coatings obtained therewith which are exposed to temperatures in the range of 500–600° C. Such coatings are however rough and can scarcely be regarded as decorative. They are dark colored or have the appearance of an aluminum coating and are therefore indeed suitable in some cases as protection against corrosion but not for kitchen stoves and domestic ovens, in which high demands are made with regard to decorative effect. This also applies to the matt and poor-looking films from the mixtures primarily usable for the production of shaped articles, which are obtained in known manner with zinc oxide or oxides and silicates of magnesium or aluminum and which must be baked at temperatures of up to 500° C.

According to the invention instead of the pigment additions hitherto customary to organosiloxane resins, titanium dioxide of rutile structure is added in an amount between 250 and 350 grams for every 100 grams of the solid resins. The films thus produced are extremely color-stable at 500° C. and have a beautiful silky gloss which they retain unaltered even after many hours at 500° C. With less than 250 grams of rutile for every 100 grams of binder, films are obtained which show cracks already after a short time at 400° C. and part from the substrate and do so the earlier, the smaller the rutile content. Films with more than 400 grams of rutile for every 100 grams of binder have a dull matt appearance and begin to turn white after a short time.

The specific advantageous results are therefore only obtained by staying within the given range of proportions between the amount of pigment and the amount of binding agent and only with the titanium dioxide of rutile structure. If the anatase pigment is used instead, one obtains at first a stronger thixotropic surface coating composition from which only dull matt and white coatings result even with small amounts of pigment.

When other heat stable pigments are employed instead of rutile, matt films result in every case, which turn chalky after short exposure to heat in the range of 400–500° C. In addition to the proportion of rutile according to the invention, however, further heat stable pigments or fillers may be admixed in a manner known as such, e.g., to attain further coloration or to raise the adhesion of the coating. These pigment additions must however only be so high that the total of all pigments in the coating composition does not exceed 350 grams for every 100 grams of resin in the solid film.

For the selection of the siloxane resin to be used as binder in the coating films, relatively wide limits apply. The advantages of the invention are obtained in simple organo polysiloxanes of the composition mentioned in the introduction, and in the likewise known mixed condensation products of such siloxanes and polyepoxides or polyesters, especially esterification products of dibasic carboxylic acids and polyhydric alcohols, as well as polycarbonates, the proportion of the silicon-free resin components being, however, less than 50%, and better still less than 30% by weight of the resin, to avoid discoloration. By using such mixed resins, an improved brushability is achieved with the coating composition as against the use of pure polysiloxane resin.

As organo polysiloxanes, phenylmethyl polysiloxanes have proved especially valuable in which the ratio of phenyl radicals to methyl radicals stands between 40:60 and 57:43 and the ratio of difunctional siloxane units to trifunctional units stands between 40:60 and 64:36.

The surface coating compositions according to the invention may contain in known manner, besides the previously mentioned pigments and the binder volatile solvents, primarily aromatic and aliphatic hydrocarbons, and one or more curing agents such as butyl titanate, organic lead and zinc compounds and other heavy metal compounds soluble in organic liquids. They can be applied to the surfaces to be covered by the usual methods. The coatings formed therefrom are no longer tacky even after drying at room temperature but they reach their best mechanical properties only after baking, by curing for about an hour to temperatures between 200 and 230° C.

Furthermore, there can be added to the surface coatings as known flowing agents, a liquid organic polysiloxane which does not cross-link on heating, in an amount of up to 2% of the weight of the binder.

The invention accordingly comprises surface coating compositions of organic polysiloxanes as binder, and titanium dioxide pigment, optionally with one or more additives selected from other pigments, known solvents, curing and flowing agents, in which the organic polysiloxanes correspond to the general formula $R_nSiO_{4-n/2}$ wherein $n$ is a number between 1 and 2 and R is alkyl or aryl, to a lesser extent also hydroxyl or alkoxy, up to 50% by weight of the organo polysiloxane, radicals of polyepoxides, polycarbonates or other polyesters, characterized in that they contain for every 100 grams of the binder at least 250 grams of titanium dioxide pigment of rutile structure, and at the most 350 grams of pigment altogether.

The unexpected effect in the surface coating compositions according to the invention lies not only in that the addition of rutile raises to more than 400° C. the thermal stability otherwise limited to about 250° C., but it is also to be regarded as surprising that in spite of the large proportions of pigment necessary for this improvement, a glossy film is obtained at all. It has hitherto only been known to the skilled in the art that the pigment quantity should amount to more than 100 grams for every 100 grams of organo polysiloxane resin. In other places, indeed, 50 grams is regarded as the limit, if value is attached to glossiness.*

---

* Compare "Fette und Seifen," vol. 55, No. 11 (1953), pages 792 to 795, especially page 93; Monograph of General Electric Company, "Silicones for the Paint Industry, Silicone Coating Technology, Section B–3. Pigmentation"; Jahrbuch Chemische Industrie 1957/58, pages 70 to 74, especially page 71; "Double Liaison," No. 87 (November 1962), pages 19 to 35, especially pages 26/28.

Example 1

100 grams of a soluble phenylmethyl polysiloxane in which the ratio of phenyl radicals to methyl radicals is 47:53 and the ratio of difunctional siloxane units to trifunctional units is 64:36, is intensively rolled in a ball mill with 285 grams of titanium dioxide pigment of rutile structure, 30 grams of heavy spar and 132 grams of a solvent consisting of aromatics and benzine. Surface coating compositions well suited for spraying are obtained which can be tested in the following way:

Sheet metal plates are coated therewith, the coating is allowed to dry for a short time at room temperature and then baked at 230° C. for an hour. The film shows good running properties, pure white color and a beautiful silken gloss. If the plates are stored in a muffle furnace for 1,000 hours at 400° C., the test plates are neither yellowed, nor otherwise colored and still exhibit a gloss without chalking. On heating the plate in a Bunsen flame to red heat, a slight coloration is finally observed but the gloss remains unchanged.

If the rutile pigment in the above-described mixture is replaced for comparison by the same weight of titanium dioxide pigment of anatase structure, a strongly thioxtropic mixture is first obtained which must be diluted with 3 to 4 times the given amount of solvent in order to work it up. After baking, the coating shows poor flowing properties and is furthermore matt. After being kept for 150 hours at 400° C. it shows strong chalking.

The same inadequate results, namely poor flowing properties, matt surfaces, and chalking are observed if the rutile in the mixture described above is replaced by the same amount by weight of red iron oxide or green chromium oxide or a spinel pigment compound of cobalt, chromium and aluminum mixed oxides.

Example 2

A mixed resin is used as binder, produced in known manner by condensing 3 parts by weight of a phenyl methyl polysiloxane containing a large number of silanol groups, in which the ratio of phenyl radicals to methyl radicals is 43:57 and the ratio of difunctional siloxane units to the trifunctional units is 51:49, with 1 part by weight of a polyester containing hydroxyl groups which has been obtained from 36.4 mol percent trimethylolpropane, 27.2 mol percent ethylene glycol and 36.4 mol percent terephthalic acid dimethyl ester.

For testing and comparison, 100 grams in each case of this binder are mixed with 132 grams of the same solvent as in Example 1 and the pigment additives indicated in the table, the mixture is painted on sheet metal plates and baked at 230° C. as described in Example 1. The coatings have the appearance noted in the table. If they are stored in a muffle furnace for 500 hours at 300° C. the following results are obtained:

| Per 100 g. of solid binder | Coating after treatment at— | |
| --- | --- | --- |
|  | 230° C. | 300° C. |
| Comparison: | | |
| 150 g. rutile | Silky gloss | Flakes off. |
| 200 g. rutile | do | Cracks. |
| By invention: | | |
| 250 g. rutile | do | Unchanged. |
| 300 g. rutile | do | Do. |
| 350 g. rutile | do | Do. |
| Comparison: | | |
| 400 g. rutile | Gloss reduced | Slight chalking. |
| 150 g. anatase | Matt | Flakes off. |
| 200 g. anatase | do | Cracks. |
| 250 g. anatase | do | Matt. |
| 300 g. anatase | do | Matt, chalky. |
| 350 g. anatase | do | Do. |
| 400 g. anatase | Matt, chalky | Do. |

Example 3

The following example shows the extent to which the rutile pigment used according to the invention can be replaced by another pigment for modification of the color. 100 grams in each case of the mixed resin described in Example 2, 300 grams of a pigment mixture indicated in the following table of titanium dioxide of rutile structure and the spinel pigment described in Example 1 and 150 grams of a customary solvent consisting substantially of xylene and mineral spirits are rolled in a ball mill.

If the surface coating composition thus obtained is sprayed on sheet metal plates and baked for an hour at 230° C., the following properties are obtained in the coating films:

WEIGHT RATIO—RUTILE: SPINEL PIGMENT

By invention:
- 270:30 —————— Beautiful silky gloss, no chalking.
- 250:50 —————— Silky gloss, no chalking.

Comparison:
- 200:100 —————— Matt, no chalking.
- 150:150 —————— Matt, trace of chalking.
- 100:200 —————— Matt, distinctly chalky.
- 30:270 —————— Matt, very chalky.

What we claim:

1. Surface coating compositions comprising a resinous organo polysiloxane as binder and a titanium dioxide pigment, wherein said organo polysiloxane has the formula $R_nSiO_{4-n/2}$ in which $n$ has a value in the range between 1 and 2 and each substituent R is selected from the group consisting of methyl, phenyl, hydroxyl, alkoxyl, co-condensed radicals of a polyepoxide and co-condensed radicals of a polyester including polycarbonate, said organo polysiloxane being composed of difunctional siloxane units and trifunctional siloxane units in a ratio of from 40:60 to 64:36, the sum of $SiO_2$, Si bonded methyl and Si bonded phenyl amounting to at least 50 percent by weight of said organo polysiloxane, the ratio of phenyl to methyl therein being from 40:60 to 57:43 and the ratio of organic radicals to silicon atoms amounting to less than 1.90:1, which surface coating composition contains for every 100 grams of the said binder at least 250 grams of titanium dioxide pigment of rutile structure and at most a total of 350 grams of heat stable pigment.

2. Surface coating composition according to claim 1 additionally containing at least one additive selected from the group consisting of spinel pigments, solvents, curing and flowing agents.

3. Surface coating composition according to claim 2 wherein said organo polysiloxane is a phenylmethyl polysiloxane in which the ratio of phenyl to methyl is 47:53 and the ratio of difunctional siloxane units to trifunctional units is 64:36 and said additives are heavy spar, and a mixture of aromatics and benzine solvents.

4. Surface coating composition according to claim 2 wherein said organo polysiloxane is obtained by condensing a phenylmethyl polysiloxane containing a large number of silanol groups, in which the ratio of phenyl to methyl is 43:57 and the ratio of difunctional siloxane units to trifunctional units is 51:49 with a polyester containing hydroxyl groups which has been obtained by reaction of trimethylol-propane, ethylene glycol and terephthalic acid dimethyl ester and said additives are heavy spar, and a mixture of aromatics and benzene solvents.

5. Surface coating composition according to claim 2 wherein said additive is the pigment spinel and is present in an amount of less than 100 grams, the total amount of additive pigment and titanium dioxide pigment not exceeding 350 grams.

(References on following page)

References Cited

UNITED STATES PATENTS

| | | | |
|---|---|---|---|
| 2,732,310 | 1/1956 | Miller | 106—300 |
| 2,766,133 | 10/1956 | Marcot et al. | 106—300 |
| 2,817,595 | 12/1957 | Kalinowski | 106—300 |
| 2,980,509 | 4/1961 | Frey | 106—300 |
| 3,137,670 | 6/1964 | Maneri. | |

OTHER REFERENCES

Barksdale: "Titanium," Ronald Press Company, 1949, p. 368.

JULIUS FROME, *Primary Examiner.*

ALLAN LIEBERMAN, *Examiner.*